US008966279B2

(12) United States Patent
Farrugia et al.

(10) Patent No.: US 8,966,279 B2
(45) Date of Patent: Feb. 24, 2015

(54) SECURING THE IMPLEMENTATION OF A CRYPTOGRAPHIC PROCESS USING KEY EXPANSION

(75) Inventors: Augustin J. Farrugia, Cupertino, CA (US); Benoit Chevallier-Mames, Paris (FR); Mathieu Ciet, Paris (FR); Thomas Icart, Paris (FR); Bruno Kindarji, Paris (FR)

(73) Assignee: Apple Inc., Cupertino, CA (US)

( * ) Notice: Subject to any disclaimer, the term of this patent is extended or adjusted under 35 U.S.C. 154(b) by 739 days.

(21) Appl. No.: 12/975,123

(22) Filed: Dec. 21, 2010

(65) Prior Publication Data

US 2012/0159186 A1    Jun. 21, 2012

(51) Int. Cl.
*G06F 12/14* (2006.01)
*H04L 9/00* (2006.01)
*H04L 9/06* (2006.01)

(52) U.S. Cl.
CPC ............. *H04L 9/002* (2013.01); *H04L 9/0631* (2013.01); *H04L 2209/16* (2013.01); *H04L 2209/24* (2013.01)
USPC .......................................... 713/189; 713/190

(58) Field of Classification Search
CPC ... H04L 9/002; H04L 9/0631; H04L 2209/24; H04L 2209/16
See application file for complete search history.

(56) References Cited

U.S. PATENT DOCUMENTS

| 2002/0118827 A1* | 8/2002 | Luyster | 380/37 |
| 2003/0103626 A1* | 6/2003 | Stein et al. | 380/42 |
| 2004/0255130 A1* | 12/2004 | Henry et al. | 713/189 |

* cited by examiner

*Primary Examiner* — Brandon Hoffman
*Assistant Examiner* — Nega Woldemariam
(74) *Attorney, Agent, or Firm* — Adeli LLP

(57) ABSTRACT

In the field of computer enabled cryptography, such as a keyed block cipher having a plurality of rounds, the cipher is hardened against an attack by protecting the cipher key by means of a key expansion process which obscures the cipher and/or the round keys by increasing their lengths to provide an expanded version of the keys for carrying out encryption or decryption using the cipher. This is especially advantageous in a "White Box" environment where an attacker has full access to the cipher algorithm, including the algorithm's internal state during its execution. This method and the associated computing apparatus are useful where the key is derived through a process and so is unknown when the software code embodying the cipher is compiled. This is typically the case where there are many users of the cipher and each has his own key, or where each user session has its own key.

40 Claims, 5 Drawing Sheets

| i | 0 | 1 | 2 | 3 | 4 | 5 | 6 | 7 |
|---|---|---|---|---|---|---|---|---|
| P0(i) | 20 | 5 | 16 | 29 | 9 | 12 | 1 | 13 |

| x6 | x1 | x4 | x5 | x7 | x2 | x0 | x3 |

| | 0 | 1 | 2 | 3 | 4 | 5 | 6 | 7 |
|---|---|---|---|---|---|---|---|---|
| P0() | 20 | 5 | 16 | 29 | 9 | 12 | 1 | 13 |

FIG. 2A

| | | | | | | | | |
|---|---|---|---|---|---|---|---|---|
| x6 | x1 | x4 | x5 | x7 | x2 | x0 | | x3 |

FIG. 2B

| | 0 | 1 | 2 | 3 | 4 | 5 | 6 | 7 |
|---|---|---|---|---|---|---|---|---|
| P1() | 25 | 14 | 3 | 31 | 8 | 26 | 20 | 5 |

FIG. 3

| | 0 | 1 | 2 | 3 | 4 | 5 | 6 | 7 |
|---|---|---|---|---|---|---|---|---|
| - | 0 | 19 | 5 | 26 | 25 | 29 | 30 | 6 |
| P2(i) | 0 | | | | | | | |

FIG. 4

Representation 1: | - | x0 | x1 | x2 | x3 | x4 | x5 | x6 | x7 |
| - | - | - | - | - | - | x5 | x6 | x7 |

FIG. 5A

Representation 2: | - | x0 | - | x1 | x2 | - | x3 | x4 | - | x5 | x6 | - | x7 |
| - | - | - | x1 | x2 | - | x3 | x4 | - | x5 | x6 | - | x7 |

FIG. 5B

SECURING THE IMPLEMENTATION OF A CRYPTOGRAPHIC PROCESS USING KEY EXPANSION

FIELD OF THE INVENTION

This invention relates to data security and cryptography and to improving the security of computer enabled cryptographic processes.

BACKGROUND

In the field of data security, there is a need for fast and secure encryption. This is why the AES (Advanced Encryption Standard) cipher has been designed and standardized. Cryptographic algorithms are widely used for encryption and decryption of messages, authentication, digital signatures and identification. AES is a well known symmetric block cipher. Block ciphers operate on blocks of plaintext and ciphertext, usually of 64 or 128 bits length but sometimes longer. Stream ciphers are the other main type of cipher and operate on streams of plain text and cipher text 1 bit or byte (sometimes one word) at a time. There are modes (notably the ECB, electronic code block) where a given block is encrypted to always the same ciphertext block. This is an issue which is solved by a more evolved mode of operations, e.g. CBC (cipher block chaining) where a chaining value is used to solve the 1-to-1 map.

AES is approved as an encryption standard by the U.S. Government. Unlike its predecessor DES (Data Encryption Standard), it is a substitution permutation network (SPN). AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Each round involves the same processes. Use of multiple rounds enhances security. Block ciphers of this type use in each round a substitution box (s-box). This operation provides non-linearity in the cipher and significantly enhances security.

Note that these block ciphers are symmetric ciphers, meaning the same key is used for encryption and decryption. As is typical in most modern ciphers, security rests with the (secret) key rather than the algorithm. The s-boxes or substitution boxes accept an n bit input and provide an m bit output. The values of m and n vary with the cipher and the s-box itself. The input bits specify an entry in the s-box in a particular manner well known in the field.

Many encryption algorithms are primarily concerned with producing encrypted data that is resistant to decrypting by an attacker who can interact with the encryption algorithm only as a "Black Box" (input-output) model, and cannot observe internal workings of the algorithm or memory contents, etc due to lack of system access. The Black Box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the Black Box model can be relaxed. An extreme relaxation is called the "White Box" model. In a White Box model, it is presumed that an attacker has total access to the system performing an encryption, including being able to observe directly a state of memory, program execution, modifying an execution, etc. In such a model, an encryption key can be observed in or extracted from memory, and so ways to conceal operations indicative of a secret key are important.

Classically, software implementations of cryptographic building blocks are insecure in the White Box threat model where the attacker controls the execution process. The attacker can easily lift the secret key from memory by just observing the operations acting on the secret key. For example, the attacker can learn the secret key of an AES software implementation by observing the execution of the key schedule algorithm.

Hence there are two basic principles in the implementation of secure computer applications (software). The Black Box model implicitly supposes that the user does not have access to the computer code nor any cryptographic keys themselves. The computer code security is based on the tampering resistance over which the application is running, as this is typically the case with SmartCards. For the White Box model, it is assumed the (hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in content protection applications to protect e.g. audio and video content.

Software implementations of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

Content protection applications are one instance where it is desired to keep the attacker from finding the secret key even though the attacker has complete control of the execution process. The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups (also referred to as TLUs) to obscure the secret key within the table lookups, and obscure intermediate state information that would otherwise be available in arithmetic implementations of AES. In the computer field, a table lookup table is an operation consisting of looking in a table (also called an array) at a given index position in the table.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key. Chow et al. provide a construction of the AES algorithm for such White Box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

The conventional implementation of a block cipher in the White Box model is carried out by creating a set of table lookups. Given a dedicated cipher key, the goal is to store in a table the results for all the possible input messages. This principle is applied for each basic operation of the block cipher. In the case of the AES cipher, these are the shiftRow, the add RoundKey, the subByte and the mixColumns operations.

However, Chow et al. do not solve all the security needs for block cipher encryption in a White Box environment. Indeed, the case where the cipher key is derived through a given process and so is unknown at the code compilation time is not included in Chow et al.

SUMMARY

A typical situation not addressed by Chow et al. is when a computer enabled and software based cryptographic process is distributed over several users and each user has his own cipher key; it is, from a practical point of view, impossible to disseminate different software code to each user. Another situation is when generating session keys (which by definition are different for each user session) through a given process. Of course, in this case the key is unknown at the software code compilation time.

This disclosure is of a powerful, efficient and new solution to harden the extraction of an AES (or other cryptographic) key in a White Box environment by means of a key expansion process. Further, the present method may be used in a more general case of other cryptographic processes, e.g., encryption or decryption of respectively a plaintext or ciphertext message. The present disclosure therefore is directed to hiding the key in a better way. This disclosure further is of two powerful, efficient and new solutions to protect an AES (or other) key in a White Box implementation. The first solution expands the support of binary vectors. The second solution performs binary operations in a covert way. These solutions may be used in a more general case, to perform all the cryptographic operations in a larger and obfuscated "world" than the conventional bytes set as explained below, being a generic and efficient protection scheme.

The present system and method address those cases when the cipher key is unknown at the software code compilation time or when the code size is limited, and there is a need to harden "dynamically" the process and hide the key to protect against an attacker. This aspect of the present disclosure can be combined with prior existing solutions. The most simple and known existing solution to combined with is to perform data transforms on the cipher key, done to avoid visible removable during execution of the cryptographic process.

BRIEF DESCRIPTION OF THE FIGURES

FIGS. 2A, 2B show two byte expansions.
FIG. 3 shows another byte expansion.
FIG. 4 shows a folding function.
FIGS. 5A, 5B show another type of expansion.

DETAILED DESCRIPTION

AES Description

Figure 1:
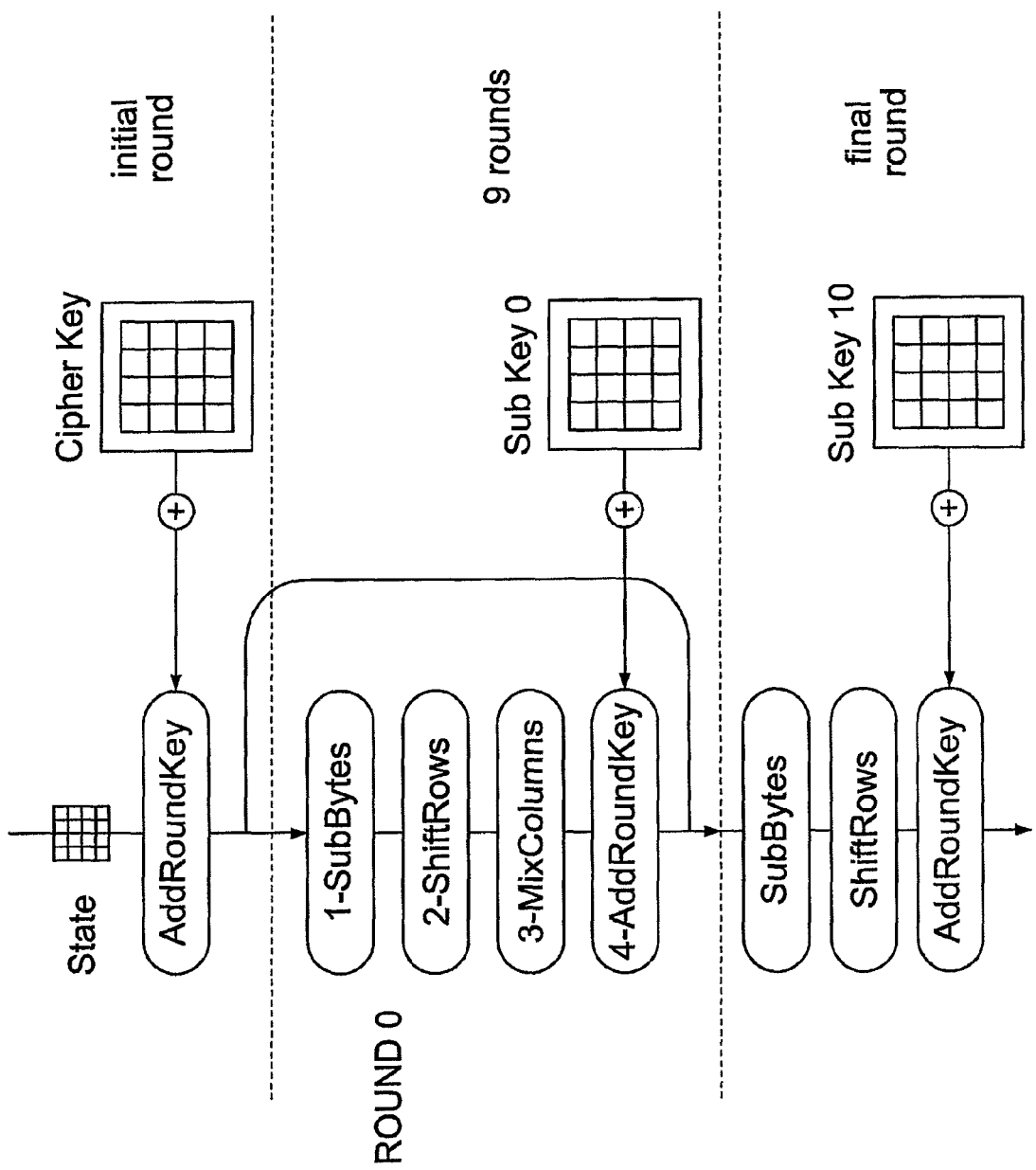
FIG. 1 shows in the prior art AES encryption.

See the NIST AES standard for a more detailed description of the AES cipher (Specification for the ADVANCED ENCRYPTION STANDARD (AES), NIST, http://csrc.nist.gov/publications/fips/fips197/fips-197.pdf). The following is a summary of the well known AES cipher. The AES cipher uses a 16 byte cipher long key, and has 10 rounds (final plus 9 others). The entire AES algorithm has the following operations as depicted in prior art FIG. 1 graphically and showing round zero of the 9 rounds:

11 AddRoundKey Operations
10 SubByte Operations
10 ShiftRow Operations
9 MixColumn Operations AES is computed using a 16-byte buffer (computer memory) referred to as the AES "state" in this disclosure and shown in FIG. 1.

To summarize,
(i) AddRoundKeys (ARK) are logically XOR'd (the Boolean exclusive OR operation) with some subkey bytes.
(ii) ShiftRows (SR) are a move from one byte location to another.
(iii) MixColums (MC) are a linear table-look up (TLU), applied to 4 bytes.
(iv) SubBytes (SB) are a non-linear TLU, applied to 1 byte.

Preliminarily to the decryption itself, in the initial round in FIG. 1, the original 16-byte cipher key is expanded to 11 subkeys designated K0, . . . , K10, so there is a subkey for each round during what is called the key-schedule. Each subkey, like the original key, is 16-bytes long.

The following explains the AES encryption process round by round. For the corresponding decryption process, one generally performs the inverse of each operation, in the inverse order. (The same is true for the cryptographic processes in accordance with the invention as set forth below. The inverse operation of ARK is ARK itself, the inverse operation of SB is the inverse subbyte (ISB) which is basically another TLU, the inverse operation of MC is the inverse mix column (IMC) which is basically another TLU, and the inverse operation of SR is the inverse shift row (ISR) which is another move from one byte location to another.

Expressed schematically, AES decryption is as follows:
ARK (K10)
ISR
ISB
ARK (K9)
IMC
ISR
ISB
ARK (K8)
IMC
ISR
ISB
ARK (K7)
IMC
ISR
ISB
ARK (K6)
IMC
ISR ISB
ARK (K5)
IMC
ISR
ISB
ARK (K4)
IMC
ISR
ISB
ARK (K3)
IMC
ISR
ISB
ARK (K2)
IMC
ISR
ISB
ARK (K1)
IMC
ISR
ISB
ARK (K0)

Without lack of generality, the description below of the present method is for the case of decryption, but it is evident that the method in accordance with the invention can be used also for encryption or other cryptographic processes. The method in accordance with the invention also can easily be applied to other variants of AES with more rounds (the 192 and 256-bit key length versions) as well as to other block ciphers and more generally to non-block ciphers and other key based cryptographic processes.

AES is considered very efficient in terms of execution on many different computer architectures since it can be executed only with table lookups (TLU) and the exclusive-or (XOR) operation. It is known that the AES state can be handled as a 4×4 square of bytes. As a square, it can be seen as 4 columns of 4 bytes each.

As described above, AES decryption is a succession of basic operations: ISB for the inverse of SubByte, IMC (for the inverse of MixColumn) and ISR (for the inverse of ShiftRow). The ISR operation modifies the state by shifting each row of the square. This operation does not modify the bytes themselves but only their respective positions. The ISB operation is a permutation from [0, 255] to [0, 255], which can be implemented by a table look-up.

The IMC operation is a bijective linear function from a column (4B) to a column. As a linear function, it accepts a matrix as a representation expressed as:

[0e, 09, 0d, 0b]
[0b, 0e, 09, 0d]
[0d, 0b, 0e, 09]
[09, 0d, 0b, 0e]

where each coefficient in this matrix represents a linear function applied to a byte. For a vector [w, x, y, z] of four bytes, the output of operation IMC is expressed as:

[[0e.w XOR 09.x XOR 0d.y XOR 0b.z],
[0b.w XOR 0e.x XOR 09.y XOR 0d.z],
[0d.w XOR 0b.x XOR 0e.y XOR 09.z],
[09.w XOR 0d.x XOR 0b.y XOR 0e.z]]

In order to be implemented efficiently, one needs to modify the order of the operations executed in AES decryption. Since IMC is a linear operation and since the ARK operation consists of logically XORing a constant to the AES state, these operations can be permuted. This idea is known and is used often in optimized AES decryption implementations.

However, this implies a modification of the keys used in the ARK operation. Let Ki be the 16-Byte subkey used in the round designated by index value i and let Ki1, Ki2, Ki3 and Ki4 be the four sets of four bytes of the keys related to the columns of the AES state. By definition, $Ki = [Ki1, Ki2, Ki3, Ki4]$.

The normal flow of operations for an AES decryption is expressed as:
ARK([Ki1, Ki2, Ki3, Ki4])
IMC
But this is equivalent to:
IMC
ARK ([IMC(Ki1), IMC(Ki2), IMC(Ki3), IMC(Ki4)])
because operation IMC is linear.

For this reason, the AES decryption is expressed schematically as:
ARK (K10)
ISR
ISB
IMC
ARK (Kx9)
ISR
ISB
IMC
ARK (Kx8)
ISR
ISB
IMC
ARK (Kx7)
ISR
ISB
IMC
ARK (Kx6)
ISR
ISB
IMC
ARK (Kx5)
ISR
ISB
IMC
ARK (Kx4)
ISR
ISB
IMC
ARK (Kx3)
ISR
ISB
IMC
ARK (Kx2)
ISR
ISB
IMC
ARK (Kx1)
ISR
ISB
ARK (K0)

where Kxi is the subround key designated above Ki and modified as explained above (with the application of the IMC operation to it). So in this new flow of operations, each ISB operation is followed by an IMC operation except for the ISB operation between keys Kx1 and K0. This property improves efficiency between K10 and K1. Note that the computation of keys Kxi can be done in the key initialization phase.

Let IS be the function applying operation ISB on a byte and let "→" define the function "x→f(x)" meaning "x becomes f(x)" so:

IS1 is the function on x: x→09.IS(x)
IS2 is the function on x: x→0b.IS(x)

IS3 is the function on x: x→0d.IS(x)
IS4 is the function on x: x→0e.IS(x)

These functions are permutations from [0, 255] to [0, 255] and are implemented by a table look-up.

Applying operations ISB and IMC to a vector designated [w, x, y, z] as in the previous example is done by computing:

[[IS4(w) XOR IS1(x) XOR IS3(y) XOR IS2(z)],
[IS2(w) XOR IS4(x) XOR IS1(y) XOR IS3(z)],
[IS3(w) XOR IS2(x) XOR IS4(y) XOR IS1(z)],
[IS1(w) XOR IS3(x) XOR IS2(y) XOR IS4(z)]]

So to apply the operations ISB and IMC during the rounds 10 to 1, it is sufficient to apply the functions IS1 to IS4 to each byte. The output bytes remain to be logically XORed together to obtain the output of the function, as shown in the example.

Note that the final round, as depicted in FIG. 1, is different since no IMC operation is used. This implies that instead of using the operations ISi, it suffices to replace them by the operation IS.

To sum up, the AES decryption is understood as a sequence of ARK and (ISB-IMC) operations. The (ISB-IMC) operation is done by table look-up and XOR operations. This last operation is implemented with 64 table look ups for each round (4 for each byte) and 48 XOR operations.

The ISR function is simply a reordering of the AES state bytes and can be ignored in the flow of operations since it can be done at the software code compilation time.

Present Method

As explained above, the White Box implementation of the AES cipher can be expressed as a sequence of ARK and TLU (table look up) operations. The ARK operations are done over 16 bytes and the TLUs can be done with tables of size 256 bytes.

The ARK is an exclusive-or (XOR) Boolean operation, which is a bit-by-bit operation.

If x1 and x2 are two n-bit long numbers, then the bit number i of (x1 XOR x2) is equal to (the bit number i of x1) XOR (the bit number i of x2). In other words, the XOR is a bit order independent operation.

This leads to the following: instead of performing the XOR operation over 8-bit long values, it is possible to expand such a byte so that the byte is expressed in a greater number of bits (i.e., n bits where n>8), perform the XOR operation in the n-bit long "world," and then return to the original "byte world."

The following therefore describes a class of methods to expand one byte into an n-bit long element. Since it is mandatory not to lose information from the original byte, n has be greater or equal to 8 (there being 8 bits per byte).

Let x be a conventional byte of 8 bits designated (b_0, b_2, b_3, b_4, b_5, b_6, b_7). A method to represent x in expanded form is to append to x some extra (n−8) bits. These "extra" bits can be random or not. Let x' designate this expanded form. Note that the original value x can easily be recovered from x' by just picking the first 8 bits of x'.

For instance, in binary form, b_0||b_1||b_2||b_3||b_4||b_5||b_6||b_7 is expanded to b_0||b_1||b_2||b_3||b_4||b_5||b_6||b_7||r_0||r_1|| . . . ||r_{n−9}, with random (r_0, . . . , r_{n−9}) bits, where || designates the concatenation operation).

Going further, it is not necessary to store the original x bits b_0 to b_7 in the first 8 bits of x'. In fact, if one permutes the 8 significant bits of x into random positions of the expanded value {0, 1, . . . , n−1}, it is still possible to uniquely recover x from x'. The direct (expansion) and reverse (recovery) transformations can be done in the following way:

Choose a random function P from [0:7] to [0:n−1], such that each function P(i) is unique (i.e., for all i in [0:7], P(i) is different). P is, e.g., an operation of the type illustrated in FIG. 2A and explained below.

Direct transformation to expand x to x':

Represent a value x=(b_0, . . . b_7) by x'=(b'_0, . . . b'{n−1}) such that if j=P(i), b'_j=b_i. For other bits, b'_j is random. (x here is the state value s or the subkey byte b.) Apply the direct transformation P independently to s and b to provide respectively s' and b'. Then compute the transformed value t' as: t'=s' XOR b'.

Reverse transformation to recover x from x':

From x'=(b'{n−1}), compute x=(b_0, . . . b_7) by selecting the components b'_j for each j=P(i). In other words, the added bits that were random above are removed in this step. So this reverse transformation is applied to t', to recover t=s XOR b.

This transformation method is referred to here as "support expansion of the bits". This is because the 8 bits issued from a byte are stored in expanded form in n bits, with the constraint that the relevant positions of [0:n−1] that are effectively used are the same for all the bytes, and depend only on the function P(i) for i in [0:7] (that is to say, the position are only defined by the index value and not by the bit value itself).

The set of the relevant indexes {P(0), . . . P(7)} is called here the "support" of the byte in the n-bit (expanded) value. The goal of this expansion is to be able to perform binary operations initially done on value x instead directly on the expanded value x'.

FIG. 2A shows an example of an expansion from x which has 8 bits (top row) to x' which has 32 bits (bottom row), using a specific expansion function Po, defined by the table of FIG. 2A. One can then expand a byte x into a 32-bit value x' as shown in FIG. 2B, where the grey cells in x' have undefined values in the most general case.

From a practical point of view, this direct transformation is only a TLU, where the table has 256 (=$2^8$) entries and the outputs x' are of n bits length. The reverse transformation to recover x is more complicated, and can be done in several ways as explained below.

The best case is when n is strictly greater than 8. In this case, there are extra (as explained above) random bits in x' to confuse the attacker. The case n is equal to 8 consists of permuting the bits themselves; this is the simplest to use in practice.

Doing an XOR Over the Expanded Elements

Before explaining how to return from the n-bit world to the 8-bit world, consider the advantage of the transformation (expansion) into the n-bit world. As stated above, the result of an XOR operation does not depend on the order in which it is performed over the bits. As a result, if x and y are two bytes and x' and y' are their respective expansion values, then (x' XOR y') is an expansion of (x XOR y). In other words, when performing a cryptographic process it is possible to stay in the expanded world and perform all XOR operations in it, and then return to the byte world.

Therefore, one can simply XOR values in the n-bit world, without returning to the regular 8-bit world. That is a key feature to hide both data and operations. As explained above, in the n-bit world there are bits present that are random bits: the goal is to confuse the attacker who needs to understand what the process is doing and is trying to extract from the obfuscated code information and values.

Another embodiment, uses several tables using the same support (i.e., with different random values in place of bits not used in the support). This embodiment is as follows:

perform the direct transformation of s into s' using a first TLU perform the direct transformation of b into b' using a second TLU.

The advantage is that the worlds (that is, the transformation algorithm) of b and s then are not exactly the same.

For the direct transformation, going from the 8-bit world to the expanded n-bit world is straight forward as described above: it is a TLU. Returning (the reverse transformation) from the n-bit (expanded) world to the 8-bit world is much more complicated. Indeed, using a TLU would be possible, but the size of such a table is $2^n$, which is much too large in many cases (for instance if n≥16). This disclosure presents solutions to solve this issue, i.e. how to return from the n-bit world to the 8-bit world efficiently (so it is practically implementable).

Reverse Transformation

Without loss of generality, suppose that n is an integer multiple of 8 (if not, then it is possible to pad a representation with additional bits until its length is a multiple of 8). Taking n as a multiple of 8 is also easily understood from an implementation point of view. So an n-bit word consists of m=(n/8) bytes. Let x' be an n-bit long number.

x' is designated as $(x'\_0, \ldots, x'\_{m-1})$ where each of the elements x'i is a byte.

The goal is to construct m TLUs each of 256 bytes, and combine each of the output bytes, in a way to reduce the total size of the tables. This is done with m tables designated T1, . . . Tm.

The m tables are used to recover the bits of x that were sent to the m-th byte. E.g., if n=32, and if the bits 0 and 3 of x are sent to first byte of x', and other bits of x are sent to second/third/fourth bytes, then the table T1 will be used to only recover bits 0 and 3 in the first byte of x'.

Table Tk is constructed such that for each index value i, if P(i) is between 8*k and 8*k+7, then the i th bit of y=Tk[x'_k] is equal to the P(i)-th bit of x'. The remainder of the bits can be set to value 0.

With this construction, then x=T1[x'_1] XOR T2[x'_2] XOR . . . XOR Tm[x'_m].

One can refine this solution by masking the tables. Masking is well known in the field. A mask value ("mask") is logically or mathematically combined with an original value to mask (hide or obscure) the original value. The original value is readily recovered from the masked value by an inverse process since the mask is known. Let Mi be m masks of (n/m) bits. Replace the previous table Ti with masked table T'i, where: T'i[x]=Ti[x] XOR Mi. Then, if each M=M1 XOR M2 . . . XOR Mm, one recovers x by computing:

x=T1[x'_1]XORT2[x'_2]XOR . . . XORTm[x'_m] XORM.

Second Embodiment

Reverse Transformation with a Small Number of XOR Operations: Iterative Folding

The previous reverse transformation embodiment is quite costly in terms of requiring many computing operations. It requires m TLUs, (m−1) XORs, plus the cost of extracting x'_i out of x', which can be a bit rotation, followed by a mask operation for each given i.

If m is a power of two (for example m=4, so n=32), then it is possible to do this more efficiently in terms of operations as follows. Restrict oneself to functions P such that for each i in [0,7], P(i) % 8 is unique (where "%" designates the mathematical modulo operation). With this condition, x'_0 XOR x'_1 XOR . . . XOR x'{m−1} is in one-to-one association with x, and a dedicated table ensures that it is possible to recover x from x'. This recovery (reverse transformation) is carried out as:

To compute x'_0 XOR x'_1 XOR . . . XOR x'{m−1} out of x', use the following procedure:
1. set index i at 1
2. rotate x' from $8*(m/(2^i))$ bits to the left into y' (this is operative whatever the bit endianess is)
3. update x'←x'XOR y'
4. repeat steps (1) and (2) with index i=i+1 until m=2i
5. x' is now equal to (x'0 XOR x'1 XOR . . . XOR x'(m−1), . . . , x'0 XOR x'1 XOR . . . XOR x'(m−1)) and masking all (m−1)*8 first bits of x' gives x'0 XOR x'1 XOR . . . XOR x'(m−1)

FIG. 3 illustrates function P1 in a table which provides an expansion from the set of bytes (top row) into the set of 32-bit words (bottom row). This function P1 is such that all the values of P1(i) % 8 are different; expanding a byte x using the expansion method described above provides the 32-bit vector x'=[x'_0, x'_1, x'_2, x'_3] where each x'_i is a byte. One can see that x'_0 XOR x'_1 XOR x'_2 XOR x'_3=(x_4, x_0,x_5,x_2,x_6,x_7,x_1,x_3) which is in one-to-one association with x.

This method enables construction of a TLU on x where the TLU is designated T[x], given x'. One constructs a table designated R which maps all the values (x_4,x_0,x_5,x_2,x_6,x_7,x_1,x_3) to the table values of T[(x_0,x_1,x_2,x_3,x_4,x_5,x_6,x_7)]. To make the TLU T[x] on x given x', then compute y=x'_0 XOR x'_1 XOR x'_2 XOR x'_3, and then return R[y]. Such a method advantageously does not reveal x. To construct table R given table T, do the following: for each x, expand x into x' fold x' into y, and set R[y] to T[n]. In the case where y is more than 8 bits long, set the remaining values of R to be random.

This method requires only log 2(m) (bitsize) rotations, log 2(m) XORs, one mask and one TLU, and is more efficient than the above method. For m=4 (i.e., n=32 bits), the overall cost is of 2 rotations, 2 XORs, 1 mask application and 1 TLU, to be compared to 3 XORs, 3 rotations, 4 TLUs and 4 masks. This method is called iterative folding because the vector x' is folded to itself, thus reducing the number of information bits by half at each iteration, until the number of information bits is equal to 8.

Third Embodiment

Reverse Transformation with Adaptive Iterative Folding

The above iterative folding method is operative when the function P is such that all the values P(i) % 8 are different. However, considering other folding methods, it is possible to describe the class of functions P that are compatible with them. This method is as follows:

A given folding algorithm is "acceptable" if the function that expands x into x', then folds x' into y, is such that for all bytes x_1, x_2 and their images y_1, y_2, y_1=y_2 only if x_1=x_2 (i.e., after folding x', there is no ambiguity over the choice of x).

The folding algorithm can output vectors of length different than 8. For example, if the final length is 9, then any expanding method such that there are 256 different 9-bit vectors after expanding and folding is acceptable. A possible construction is to use a function P such that all the P(i) % 9 are different, and expand x into x' using the aforementioned expansion method.

FIG. 4 is an example of such a function P2 expressed as a table such that all values P2(i) % 9 (bottom row) are different. From function P2, the following is an example of a folding method to obtain a shorter binary string that can be obtained only from the original byte.

Given P2 and x, expand the support of x into [0:31] bits by storing the xi into x'_P2(i). Then, fold x' 2 times over itself by shifting 18 bit positions to the left, then XORing, then shifting 9 bit positions to the left, then XORing. As all the values of P2(i) % 9 are different, thus the leading 9 bits of the result can only be obtained by this method from x.

Another possible construction is to duplicate some bits but not all, as is illustrated by the following example:
1. x=(x_0, . . . ,x_7) is expanded into x'=(x_0,x_1,x_2,x_3,x_4,x_5,x_6,x_7,x_0,x_1,x_2,x_3,x_4,x_5,x_6,0)
2. x' is rotated 9 bits to the left into y=(x_1,x_2,x_3,x_4,x_5,x_6,0, x_0,x_1,x_2,x_3,x_4,x_5,x_6,x_7,x0)
3. x' and y are XORed together to compute z=(x_0 XOR x_1, x_1 XOR x_2, x_2 XOR x_3, x_3XOR x_4, _4 XOR x_5, x_5 XOR x_6, x_6 XOR x_7, x_0, . . . )
4. The 9 (or even 8, here) first bits of z enable one to uniquely recover x through a TLU.

As seen, there are many possibilities of folding and expanding methods. So in accordance with the invention, the expansion method is constructed from a given folding algorithm. In fact, this method (i) selects a folding algorithm to be read in the reverse transformation; and (ii) from it has the value of P( ) which defines its direct transformation.

A general case folding algorithm is an arbitrary sequence, designated A, of bit shift and XORs of n-bit vector x'. From such a sequence A, the construction of an adequate expansion method can be done by examining the resulting bits, and solving the equation system (in the function P) in such a way that there is only one x for each A(x').

In other words, if the expansion algorithm is denoted E such that x'=E(x), and if E depends on P, constructing E is the same as finding an acceptable P such that for all x_1, x_2, where x_1≠x_2, A(E(x_1)) is different from A(E(x_2)).

For instance, if the folding algorithm A consists of computing x' XOR (RotateLeft(x',12)) XOR (RotateLeft(x', 15)) and taking the first 10 bits of the result, finding algorithm E consists of finding a map from the set of bytes to all 32-bit vectors, such that all the values of:

| |
|---|
| x'0 XOR x'12 XOR x'15 |
| x'1 XOR x'13 XOR x'16 |
| x'2 XOR x'14 XOR x'17 |
| x'3 XOR x'15 XOR x'18 |
| x'4 XOR x16 XOR x'19 |
| x'5 XOR x17 XOR x'20 |
| x'6 XOR x'18 XOR x'21 |
| x'7 XOR x'19 XOR x'22 |
| x'8 XOR x'20 XOR x'23 |
| x'9 XOR x'21 XOR x'24 | are different. There are many known solutions for these constraints, and any of them is an acceptable expanding algorithm.

Fourth Embodiment

Expansion that Replaces XOR with Other Boolean Operations

The XOR operation can be computed conventionally by a direct CPU (central processing unit—processor) software instruction, but as is well known, it can also be computed in other ways. Where "AND" represents the Boolean "and" operation, "OR" the Boolean "or" operation, and "NOT" the Boolean "not" operation, then the following is true by definition:

a XOR b=(a AND (NOT b)) OR ((NOT a) AND b)

a XOR b=(a OR b) AND ((NOT a) OR (NOT b))

a XOR b=NOT ((NOT((NOT a) or b)) or (NOT (a or (NOT b))))

a XOR b=NOT((NOT (a AND (NOT b))) and (NOT ((NOT a) AND b)))

Rewriting the XOR operation in these ways enables other expansion algorithms. Instead of using 8 bits out of the n bits finally taken by the expansion x', one uses 16 bits out of bits n. All the bits of both x and (NOT x) are stored in x'.

As an example, expand x over 32 bits as (0, . . . 0, x_0,x_1,x_2 . . . x_7, NOT x_0, . . . NOT x_7) where there are 16 zero bits at the beginning, then all the bits of x, then all the bits of NOT x.

Let f be a function that expands x into x' in such a way. In practice, function f may be implemented by a TLU. It is possible to compute x XOR y in the following way:

expand x into x', and y into y' compute z=x' OR y'. The first 16 bits of z are 0, the following 8 bits are the bits of (x OR y), and the last 8 bits are the bits of ((NOT x) OR (NOT y)).

rotate z 8 bits to the right into z_1, and compute z and z_1. This is a 32-bit vector whose 8-bit value is exactly x XOR y.

It is also possible to perform the operations in the other way: compute z=x' AND (NOT y'), rotate of 8 bits to the right into z_1, and compute z OR z_1. The last 8 bits provide directly the result of x XOR y.

The advantage of such a method is enhanced security, since the XOR operation is never revealed as such to an attacker. It is possible to provide TLUs to create the expanded versions of x and y, then another TLU provides x XOR y. The first method is called here the conjunctive method since the final step is to compute a Boolean "and", and the second method is called the disjunctive method, since the final step is to compute a Boolean "or".

A refinement of this method consists of mixing the bits of x and those of (NOT x) in the expansion x'. This means that a bit of x' can randomly be set to x_i (case 1) or to (NOT x_i) (case 2) provided that the corresponding bit (NOT x_i) in case 1 and x_i in case 2 appears in x. FIGS. 5A, 5B illustrate two different representations of x=(x_0,x_1, . . . , x_7) which provide the same result if one applies the XOR rewriting. The NOT operation here is designated "]."

The advantage of using the second representation is that it is difficult to know which bit is a bit of x and which bit is the negation of a bit of x (NOT x).

Since the remaining n-16 bits are not used (these are the grey cells in FIGS. 5A, 5B), it is possible to assign those grey cells to random values without interfering with the above calculations.

It is also possible to combine this method with a folding method, for example to represent x with x'=(m, x XOR m, m1, (NOT x) XOR m_1) where m and m1 are two 8-bit masks. Then, after one shifting from 8 positions to the right and XORing (i.e. computing x' XOR (rotateRight(x',8)), recover (0,x,0, NOT x), and apply the above conjunctive or disjunctive method. Here again, the order of the bits of m and x XOR m can be mixed; even more, the order of the bits of x XOR m and (not x) XOR m_1 can be mixed as long as the order is known in advance.

The overall process is as follows:

From x, construct x'=T1[x] where T1 is a 256-entry table that outputs n-bit values, using an expansion algorithm E.

To compute (x XOR y)', compute x' and y' with the table T1. Apply the method described above, to obtain z' in which the last 8 bits or more (designated z_1) uniquely represent x XOR y; apply a second table T2 so that T2[z_1]=T1[x XOR y].

The choice of table T1 and the method to obtain z' can be one of the above methods, or a combination of them.

The following is an example of the processing steps to perform an ARK operation (which is in practice a XOR operation) followed by a TLU over a table T.

x is the byte to be XORed with the round key k (where each of x and k are bytes). First, expand x and k using a table T_R2 that implements Representation 2 (FIG. 5B), i.e. takes 8 bits as inputs, and outputs 32 bits. This provides the vectors x' and k'. Compute z'=x' or k', then z'=z and RotateLeft(z,16). The ARK step is done. It is then possible to do a TLU (as is conventional in the AES cipher) using the table T.

Figure 6:
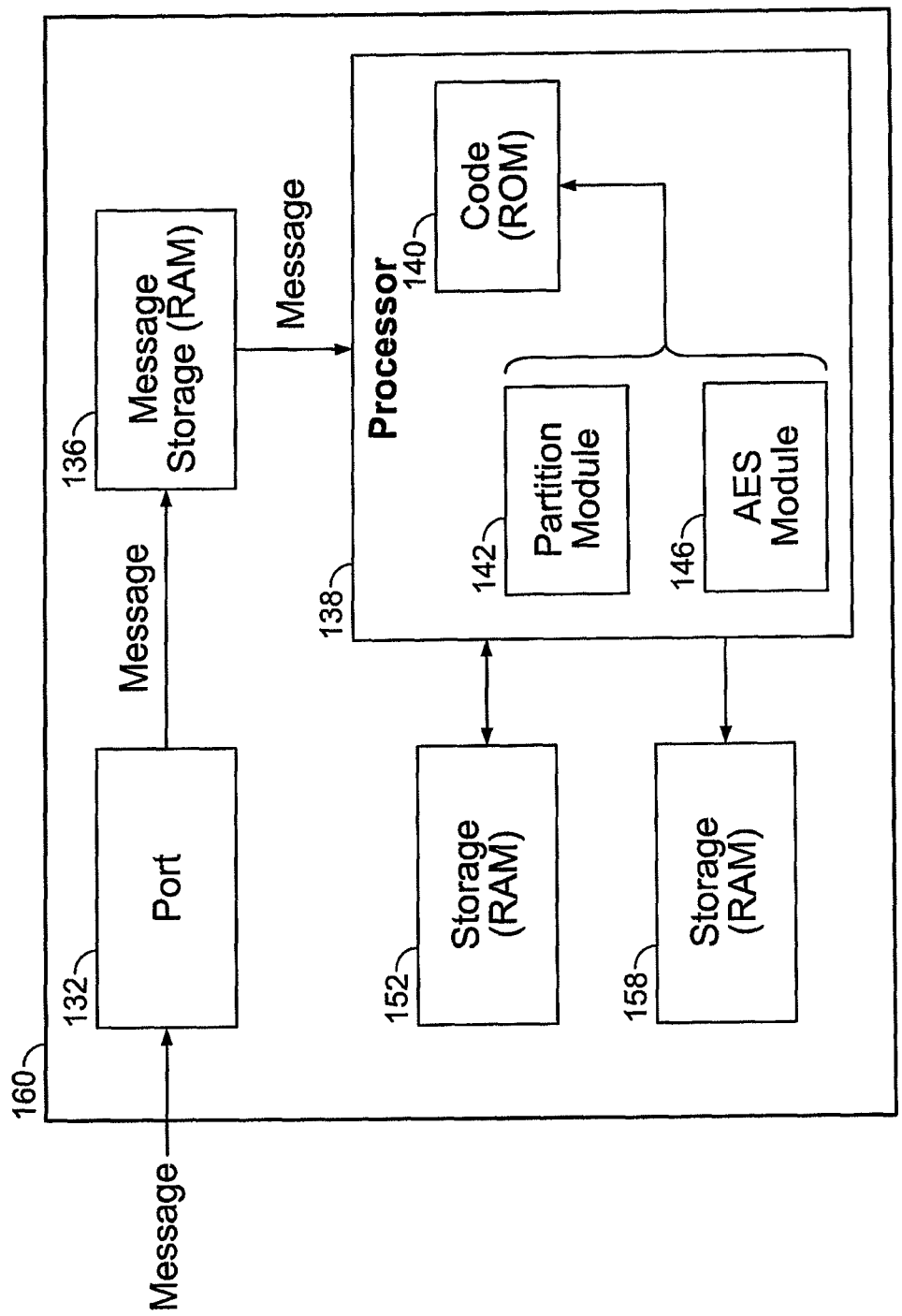
FIG. 6 shows a computing system in accordance with the invention.

FIG. 6 shows in a block diagram relevant portions of a computing device (system) 160 in accordance with the invention which carries out the cryptographic process as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Essentially a similar apparatus encrypts the message, and may indeed be part of the same platform.

The computer code is conventionally stored in code memory (computer readable storage medium) 140 (as object code or source code) associated with conventional processor 138 for execution by processor 138. The incoming ciphertext (or plaintext) message (in digital form) is received at port 132 and stored in computer readable storage (memory 136 where it is coupled to processor 138. Processor 138 conventionally then partitions the message into suitable sized blocks at partitioning module 142. Another software (code) module in processor 138 is the decryption module 146 which carries out the key-schedule functionality and decryption functions set forth above, with its associated computer readable storage (memory) 152.

Also coupled to processor 138 is a computer readable storage (memory) 158 for the resulting decrypted plaintext message. Storage locations 136, 140, 152, 158 may be in one or several conventional physical memory devices (such as semiconductor RAM or its variants or a hard disk drive). Electric signals conventionally are carried between the various elements of FIG. 6. Not shown in FIG. 6 is any subsequent conventional use of the resulting plaintext or ciphertext stored in storage 145.

Figure 7:
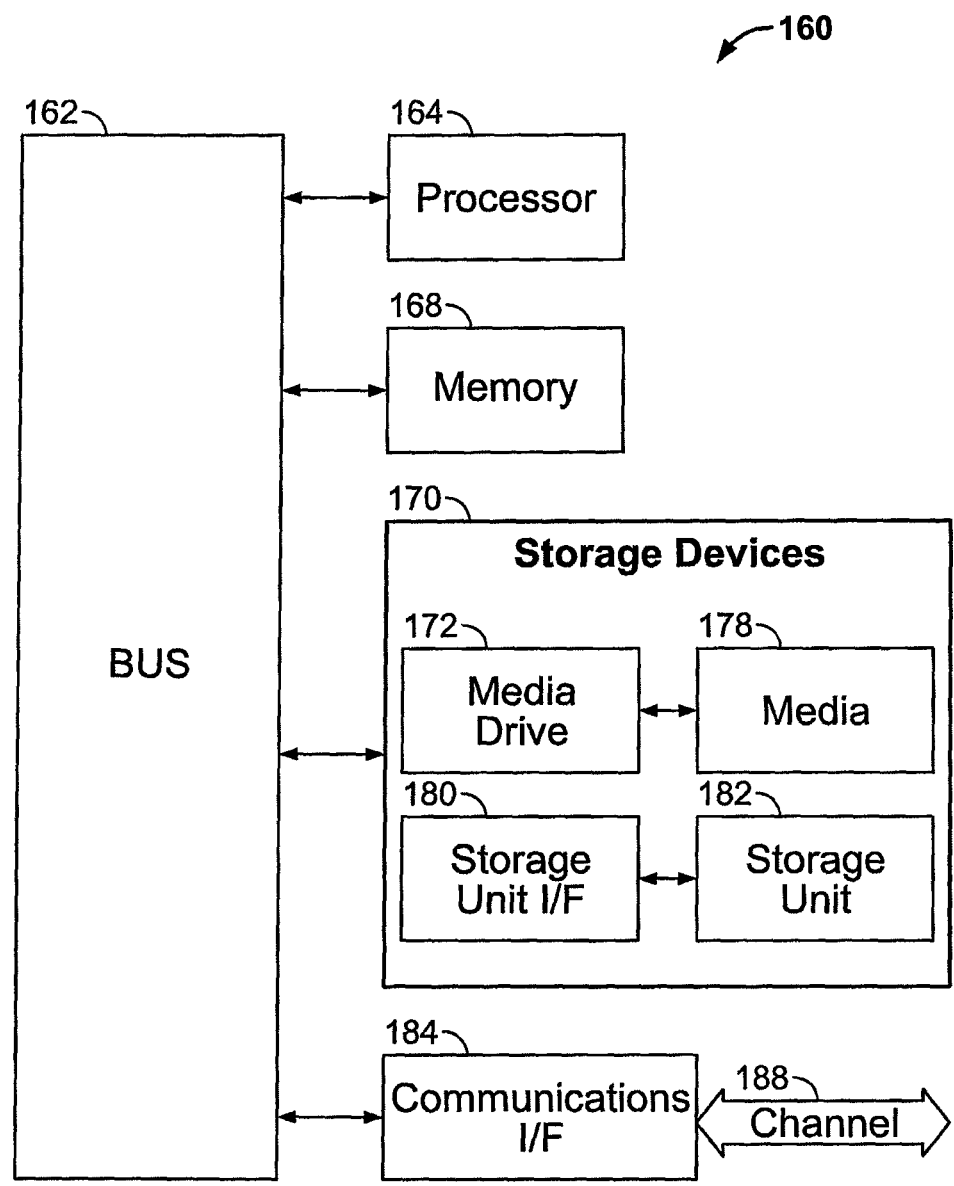
FIG. 7 shows a computing system as known in the art and used in accordance with the invention.

FIG. 7 illustrates detail of a typical and conventional embodiment of computing system 160 that may be employed to implement processing functionality in embodiments of the invention as indicated in FIG. 6 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 6). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to part 132 in FIG. 6). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method for applying a cryptographic process to a message using at least one key, the method comprising:
expanding a key for the cryptographic process into a plurality of new keys using a first expansion function, each new key associated with a different round of the cryptographic process;
prior to using a particular one of the new keys for an associated particular round of the cryptographic process, applying a second expansion function to the particular new key that uniquely maps each bit of the particular new key to a different location in an expanded new key in a different order, wherein the expanded new key includes additional bits between the mapped bits;
applying the particular round of the cryptographic process to a portion of the message using the expanded new key to produce an expanded result; and
recovering an encrypted version of the message portion from the expanded result using a recovery function, wherein the recovery function recovers only bits from the expanded result that have been subject to a cryptographic operation involving the mapped bits from the expanded new key.

2. The method of claim 1 further comprising looking up an expansion of the portion of the message in an expansion table, wherein applying the particular round of the cryptographic process to the portion of the message comprises applying the cryptographic process to the expansion of the portion of the message.

3. The method of claim 2, wherein the expansion table is part of a set of expansion tables, each expansion table including a plurality of random entries differing between the tables.

4. The method of claim 1, wherein the cryptographic process is a block cipher which includes a plurality of rounds.

5. The method of claim 1, wherein the second expansion function includes a table with a plurality of random entries.

6. The method of claim 1, wherein the second expansion function includes a table that randomly permutes an order of bits of the particular new key in order to produce the different order of the expanded new key.

7. The method of claim 1, wherein each round of the cryptographic process includes applying a predetermined set of operations, each operation being one of an exclusive OR, a bit move, and a table lookup, and wherein all exclusive-OR operations in the cryptographic process are performed using expanded new keys.

8. The method of claim 1, wherein the recovery function performs a plurality of table look-ups in a set of look-up tables, each look-up table associated with a unique section of the expanded result.

9. The method of claim 8, wherein the look-up tables are masked.

10. The method of claim 1, wherein the expanded result is n bits in length.

11. The method of claim 10, further comprising padding the expanded result with additional bits until the padded result is a multiple of 8.

12. The method of claim 10, further comprising reducing the expanded results to be n/2 bits in length by applying a sequence of bit shift operations and exclusive-OR operations to the expanded result.

13. A non-transitory machine readable medium storing a program which when executed by at least one processing unit applies a cryptographic process to a message using at least one key, the program comprising sets of instructions for:
expanding a key for the cryptographic process into a plurality of new keys using a first expansion function, each new key associated with a different round of the cryptographic process;
prior to using a particular one of the new keys for an associated particular round of the cryptographic process:
applying a second expansion function to the particular new key that uniquely assigns each bit of the particular new key to a different location in an expanded new key; and
applying the second expansion function to a segment of cryptographic state derived from the message that uniquely assigns each bit of the segment of cryptographic state to a different location in an expanded segment of cryptographic state;
applying the particular round of the cryptographic process to the expanded segment of cryptographic state using the expanded new key to produce an expanded result; and
recovering an encrypted version of the message portion from the expanded result using a recovery function.

14. The non-transitory machine readable medium of claim 13, wherein the second expansion function comprises an expansion table.

15. The non-transitory machine readable medium of claim 14, wherein the expansion table is part of a set of expansion tables, each expansion table having a plurality of pseudo-random entries differing between the tables.

16. The non-transitory machine readable medium of claim 13, wherein the cryptographic process is a block cipher.

17. The non-transitory machine readable medium of claim 13, wherein the second expansion function comprises an expansion table with a plurality of pseudo-random entries.

18. The non-transitory machine readable medium of claim 13, wherein the second expansion function comprises an expansion table that pseudo-randomly permutes an order of bits of the particular new key.

19. The non-transitory machine readable medium of claim 13, wherein each round of the cryptographic process includes applying a predetermined set of operations, each operation being one of an exclusive OR, a bit move, and a table lookup, and wherein all exclusive-OR operations in the cryptographic process are performed using expanded new keys.

20. The non-transitory machine readable medium of claim 13, wherein the recovery function performs at least one table look-up.

21. The non-transitory machine readable medium of claim 13, wherein the recovery function performs a plurality of table look-ups in a set of look-up tables, each look-up table associated with a unique section of the expanded result.

22. The non-transitory machine readable medium of claim 21, wherein the look-up tables are masked.

23. The non-transitory machine readable medium of claim 13, wherein the expanded result is n bits in length.

24. The non-transitory machine readable medium of claim 23, wherein the program further comprises a set of instructions for padding the expanded result with additional bits until the padded result is a multiple of 8.

25. The non-transitory machine readable medium of claim 23, wherein the set of instructions for recovering the encrypted version of the message portion comprises a set of instructions for reducing the expanded results to be n/2 bits in length by applying a sequence of bit shift operations and exclusive-OR operations to the expanded result in order to produce a reduced result.

26. The non-transitory machine readable medium of claim 25, wherein the set of instructions for recovering the encrypted version of the message portion further comprises a set of instructions for mapping the reduced result to a plurality of different recovered bytes of the encrypted version of the message portion.

27. The non-transitory machine readable medium of claim 13, wherein the second expansion function changes an order of the bits of the new key as represented in the expanded new key.

28. A method for applying a cryptographic process to an encrypted message using at least one key, the method comprising:
    expanding a cipher key for the cryptographic process into a plurality of new keys using a first expansion function, wherein each new key has a same length as the cipher key, and wherein each new key is associated with a different round of the cryptographic process;
    prior to using a particular one of the new keys for an associated particular round of the cryptographic process, applying a second expansion function to the particular new key that uniquely assigns each bit of the particular new key to a different location in an expanded new key, wherein the expanded new key is longer than the particular new key;
    applying the particular round of the cryptographic process to a portion of the encrypted message using the expanded new key to produce an expanded result; and
    recovering a decrypted version of the message portion from the expanded result using a recovery function.

29. The method of claim 28 further comprising looking up an expansion of the portion of the encrypted message in an expansion table, wherein applying the particular round of the cryptographic process to the portion of the message further comprises applying the cryptographic process to the expansion of the portion of the encrypted message.

30. The method of claim 29, wherein the expansion table is part of a set of expansion tables, each expansion table including a plurality of random entries differing between the tables.

31. The method of claim 28, wherein each round of the cryptographic process includes applying a predetermined set of operations, each operation being one of an exclusive OR, a bit move, and a table lookup, and wherein all exclusive-OR operations in the cryptographic process are performed using expanded new keys.

32. The method of claim 28, wherein the recovery function performs a plurality of table look-ups in a set of look-up tables, each look-up table associated with a unique section of the expanded result.

33. The method of claim 28, wherein the expanded result is n bits in length and wherein the method further comprises reducing the expanded results to be n/2 bits in length by applying a sequence of bit shift operations and exclusive-OR operations to the expanded result.

34. The method of claim 28, wherein the second expansion function changes an order of the bits of the new key as represented in the expanded new key.

35. A non-transitory machine readable medium storing a program which when executed by at least one processing unit applies a cryptographic process to an encrypted message using at least one key, the program comprising sets of instructions for:
    expanding a key for the cryptographic process into a plurality of new keys using a first expansion function, each new key associated with a different round of the cryptographic process;
    applying, prior to using a particular one of the new keys for an associated particular round of the cryptographic process, a second expansion function to the particular new key that uniquely maps each bit of the particular new key to a different location in an expanded new key in a different order, wherein the expanded new key includes additional bits between the mapped bits;
    applying the particular round of the cryptographic process to a portion of the encrypted message using the expanded new key to produce an expanded result; and
    recovering a decrypted version of the message portion from the expanded result using a recovery function, wherein the recovery function recovers only bits from the expanded result that have been subject to a cryptographic operation involving the mapped bits from the expanded new key.

36. The non-transitory machine readable medium of claim 35, wherein the recovery function performs a plurality of table look-ups in a set of look-up tables, each look-up table associated with a unique section of the expanded result.

37. The non-transitory machine readable medium of claim 36, wherein the look-up tables are masked.

38. The non-transitory machine readable medium of claim 35, wherein the expanded result is n bits in length.

39. The non-transitory machine readable medium of claim 38, wherein the set of instructions for recovering a decrypted version of the message portion comprises a set of instructions for padding the expanded result with additional bits until the padded result is a multiple of 8.

40. The non-transitory machine readable medium of claim 38, wherein the set of instructions for recovering a decrypted version of the message portion comprises a set of instructions for reducing the expanded result to be n/2 bits in length by applying a sequence of bit shift operations and exclusive-OR operations to the expanded result.

* * * * *